(12) United States Patent
Jeon et al.

(10) Patent No.: US 8,660,092 B2
(45) Date of Patent: Feb. 25, 2014

(54) METHOD AND APPARATUS FOR HANDOVER IN WIRELESS COMMUNICATION SYSTEM

(75) Inventors: Young-Hyun Jeon, Guri-si (KR); Chan-Ho Min, Seoul (KR); Ju-Mi Lee, Seoul (KR); Yung-Soo Kim, Seongnam-si (KR); Jong-Hyung Kwun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 354 days.

(21) Appl. No.: 13/020,880

(22) Filed: Feb. 4, 2011

(65) Prior Publication Data

US 2011/0188472 A1 Aug. 4, 2011

(30) Foreign Application Priority Data

Feb. 4, 2010 (KR) ........................ 10-2010-0010554

(51) Int. Cl.
*H04W 4/00* (2009.01)
*H04W 36/00* (2009.01)

(52) U.S. Cl.
USPC .......................................... 370/332; 455/438

(58) Field of Classification Search
None
See application file for complete search history.

(56) References Cited

U.S. PATENT DOCUMENTS

| 2008/0167041 A1* | 7/2008 | Wang et al. .................... 455/436 |
| 2009/0028112 A1* | 1/2009 | Attar et al. ..................... 370/332 |
| 2009/0111503 A1* | 4/2009 | Pedersen et al. ............... 455/522 |
| 2010/0029211 A1* | 2/2010 | Teague .......................... 455/63.1 |
| 2011/0045831 A1* | 2/2011 | Chiu et al. ..................... 455/436 |

* cited by examiner

*Primary Examiner* — Otis L Thompson, Jr.
*Assistant Examiner* — Ashley Shivers

(57) ABSTRACT

A method and an apparatus ensure efficient handover in a wireless communication system even when a User Equipment (UE) moves at a high speed. A serving eNB receives interference power information of an uplink (UL) signal and interference increase/decrease information of the UL signal from at least one adjacent eNB. an adjacent eNB, for which the received interference power information indicates that interference power of the UL signal is equal to or greater than a threshold value, is selected as a target eNB for a User Equipment (UE) among the at least one adjacent eNB. Whether handover of the UE is delayed is determined based on the interference increase/decrease information received from the target eNB. And if the handover of the UE is delayed, a handover parameter is transmitted to the UE to perform handover to the target eNB.

30 Claims, 9 Drawing Sheets

METHOD AND APPARATUS FOR HANDOVER IN WIRELESS COMMUNICATION SYSTEM

CROSS-REFERENCE TO RELATED APPLICATION(S) AND CLAIM OF PRIORITY

The present application is related to and claims priority under 35 U.S.C. §119(a) to a Korean Patent Application entitled "Method and Apparatus for Handover in Wireless Communication System" filed in the Korean Industrial Property Office on Feb. 4, 2010 and assigned Serial No. 10-2010-0010554, the contents of which are incorporated herein by reference.

TECHNICAL FIELD OF THE INVENTION

The present invention relates to a method and an apparatus for handover in a wireless communication system.

BACKGROUND OF THE INVENTION

In the LTE (Long Term Evolution), which is next generation communication technology, a downlink uses the OFDMA (Orthogonal Frequency-Division Multiple Access) and an uplink uses SC-FDMA (Single-Carrier Frequency Division Multiple Access) for the purpose of the transmission of high-rate data. The LTE provides the 3GPP (Third Generation Partnership Project) with competitive wireless access technology.

A wireless communication system should provide terminals that have mobility with continuous service, in contrast with a wired communication system. That is, when a User Equipment (UE) moves from one region to another region, the wireless communication system has to enable the UE to continuously use the service.

Specifically, when the UE moves closer to another enhanced Node B (eNB) than an eNB that is currently providing the UE with the service, the UE has to be able to receive the service from the closer eNB. Therefore, in the wireless communication system, a handover operation, in which the UE terminates communication with a serving eNB from which the UE currently receives the service and initiates communication with a new eNB of a target eNB, has to be performed.

Additionally, in a wireless communication system, the handover operation is performed based on a system parameter for each cell according to a movement speed of the UE which is classified as one of a high speed (120 km/h or higher), a middle speed (between 30 km/h and 120 km/h), and a low speed (between 1 km/h and 30 km/h). Therefore, when the UEs move in a different movement speed equal to or higher than 120 km/h in the conventional wireless communication system, all of the UEs cannot help performing the handover based on the identical system parameter for each cell. In this respect, in the conventional wireless communication system, the UEs have no choice but to use handover control information predetermined for each cell in the performance of the handover. Further, the conventional handover has a problem in that the time for measuring RSRP (Reference Signal Received Power) and transmitting a measurement result to the serving eNB by the UE is longer than a movement time of the UE. Therefore, the high-speed UE cannot perform the fast handover, such that it inevitably has a RLF (Radio Link Failure) problem of connection interruption of a wireless link during the performance of the handover.

Hereinafter, a problem according to a movement speed of a UE in a wireless communication system during the performance of the handover will be described with reference to FIG. 1.

FIG. 1 is a graph illustrating a movement distance of a low-speed UE and a high-speed UE in the conventional wireless communication system.

Referring to FIG. 1, a movement distance 100 of the low-speed UE which moves at a speed of 120 km/h or less during a triggering time of the handover is shorter than a movement distance 120 of the high-speed UE which moves at a speed faster than 120 km/h. Therefore, a location 140 at a handover performance time of the low-speed UE is inevitably different from a location 160 at a handover performance time of the high-speed UE.

When the UE moves at a low rate, there may occur a ping-pong phenomenon due to the effect of shadowing, fast fading, and such. Further, there a problem may occur in that the handover is first performed before the UE moves to a target cell, thereby resulting in the RLF.

In addition, the high-speed UE is closer to a target eNB than a serving eNB at the time of transmitting a DL reference signal strength, i.e. DL RSRP, to the serving eNB. Therefore, an SINR (Signal to Interference plus Noise Ratio) from the serving eNB decreases and a generation possibility of the RLF increases in a corresponding location of the high-speed UE. Further, a handover delay problem may occur in that even when the high-speed UE has moved to a location within the target cell, the handover is not performed, such that the RLF may be incurred due to the delay of the handover.

Furthermore, in the event that the high-speed UE suddenly changes a route during the preparation of the handover to the target eNB after the deciding to handover from the serving eNB to the target eNB based on an RSRP measurement result reported from the high-speed UE, there is a problem of failure of the prevention of the RLF generation.

In general, in the LTE communication system, the UE measures the DL RSRP of multiple eNBs in a long period, e.g. in a period of 200 ms. Furthermore, in the event of the generation of an event related to the handover in accordance with an event-triggering scheme, the UE reports the measured RSRP to the serving eNB.

However, the aforementioned method is the method used for the low-speed UE, such that when the aforementioned method is used in the high-speed UE, many problems according to the performance of the handover are created. That is, when the high-speed UE measures the DL RSRP of the multiple eNBs in a long period similar to the low-speed UE, a distance difference between a location at the measurement time of the DL RSRP and a location at the report time of the measurement result of the DL RSRP to the serving eNB is large in comparison with the low-speed UE, such that the accuracy and the efficiency of the handover are deteriorated.

Therefore, there is a request for a method for performing efficient handover without service interruption due to the RLF even when the UE moves at a high rate.

SUMMARY OF THE INVENTION

To address the above-discussed deficiencies of the prior art, it is a primary object to provide a method and an apparatus for handover in a wireless communication system.

Also, the present invention provides a method and an apparatus for handover in a wireless communication system that can ensure the efficient handover without service interruption even when a UE moves at a high rate.

Also, the present invention provides a method and an apparatus for handover in a wireless communication system, which can decrease a generation frequency of RLF of a UE and improve a quality of service during the performance of the handover.

In accordance with an aspect of the present invention, there is provided a method for handover of a serving enhanced Node B (eNB) in a wireless communication system. The method includes receiving interference power information of an uplink (UL) signal and interference increase/decrease information of the UL signal from at least one adjacent eNB. An adjacent eNB, for which the received interference power information indicates that the interference power of the UL signal is equal to or greater than a threshold value, is selected as a target eNB for a User Equipment (UE) among the at least one adjacent eNB. Whether handover of the UE is delayed is determined based on the interference increase/decrease information received from the target eNB. And if the handover of the UE is delayed, a handover parameter is transmitted to the UE to perform handover to the target eNB.

In accordance with another aspect of the present invention, there is provided a method for handover of an adjacent enhanced Node B (eNB) in a wireless communication system. The method includes transmitting interference power information of an uplink (UL) signal to a serving eNB. Whether interference power of the UL signal is equal to or greater than a threshold value is determined. If the interference power of the UL signal is equal to or greater than the threshold value, interference increase/decrease information of the UL signal including increase/decrease information for interference power equal to or greater than the threshold value is generated during a preset time interval. The interference increase/decrease information is transmitted to the serving eNB. And if a request for handover for a User Equipment (UE) is received from the serving eNB, a handover procedure is performed with the UE.

In accordance with another aspect of the present invention, there is provided a method for handover of a User Equipment (UE) in a wireless communication system. The method includes receiving a first handover parameter set in accordance with a wireless environment of a cell from a serving enhanced Node B (eNB). A strength of a reference signal of each of the serving eNB and an adjacent eNB is measured based on the first handover parameter. If a difference between strengths of reference signals for the serving eNB and the adjacent eNB is equal to or less than a threshold value, a second handover parameter set is received based on a movement speed of the UE from the serving eNB. And handover to the adjacent eNB is performed based on the second handover parameter.

In accordance with another aspect of the present invention, there is provided a method for handover of a serving enhanced Node B (eNB) in a wireless communication system. The method includes receiving interference power information of an uplink (UL) signal and interference increase/decrease information of the UL signal from a plurality of adjacent eNBs. Adjacent eNBs, for which the received interference power information indicates that interference power of the UL signal is equal to or greater than a threshold value are identified among the plurality of adjacent eNBs. Whether handover of a User Equipment (UE) is delayed and a previously selected target eNB was incorrectly selected is determined based on the interference increase/decrease information received from the identified adjacent eNBs. A target eNB of the UE is re-selected as a final target eNB based on the interference increase/decrease information received from the identified adjacent eNBs. And a handover parameter is transmitted to the UE to perform handover to the re-selected target eNB.

In accordance with another aspect of the present invention, there is provided a method for handover of a serving enhanced Node B (eNB) in a wireless communication system. The method includes receiving interference power information of an uplink (UL) signal and interference increase/decrease information of the UL signal from a plurality of adjacent eNBs. A first adjacent eNB, for which the received interference power information indicates that interference power of the UL signal is equal to or greater than a threshold value among the plurality of adjacent eNBs, is selected as a target eNB. Whether handover of a User Equipment (UE) is delayed is determined and whether the UE is to handover to the first adjacent eNB is decided based on the interference increase/decrease information received from the first adjacent eNB. Whether the target eNB is incorrectly selected is determined and a target eNB of the UE is re-selected based on the interference increase/decrease information received from the first adjacent eNB after a determination time of the handover. And a handover parameter is transmitted to the UE to perform handover to the re-selected target eNB.

In accordance with an aspect of the present invention, there is provided a handover apparatus of a serving enhanced Node B (eNB) in a wireless communication system. The handover apparatus includes a transmission/reception unit for performing wireless communication with a User Equipment (UE). An eNB interface unit receives interference power information of an uplink (UL) signal and interference increase/decrease information of the UL signal from at least one adjacent eNB. A memory stores the received interference power information of the UL signal and the received interference increase/decrease information of the UL signal. And a controller selects an adjacent eNB, for which the received interference power information indicates that interference power of the UL signal is equal to or greater than a threshold value, as a target eNB for the UE among the at least one adjacent eNB, determines whether handover of the UE is delayed based on the interference increase/decrease information received from the target eNB, and if the handover of the UE is delayed, transmits a handover parameter to the UE to perform handover to the target eNB.

In accordance with another aspect of the present invention, there is provided a handover apparatus of an adjacent enhanced Node B (eNB) in a wireless communication system. The handover apparatus includes a transmission/reception unit for performing wireless communication with a User Equipment (UE). An eNB interface unit performs communication with a serving eNB. And a controller transmits interference power information of an uplink (UL) signal to the serving eNB, determines whether interference power of the UL signal is equal to or greater than a threshold value, if the interference power of the UL signal is equal to or greater than the threshold value, generates interference increase/decrease information of the UL signal including increase/decrease information for interference power equal to or greater than the threshold value during a preset time interval, transmits the interference increase/decrease information to the serving eNB, and if a request for handover for the UE is received from the serving eNB, performs a handover procedure with the UE.

In accordance with another aspect of the present invention, there is provided a handover apparatus of a User Equipment (UE) in a wireless communication system. The handover apparatus includes a transmission/reception unit for performing wireless communication with a serving enhanced Node B (eNB). A memory stores a first handover parameter set in accordance with a wireless environment of a cell and a second handover parameter set based on a movement speed of the UE. And a controller receives the first handover parameter from the serving eNB, measures a strength of a reference signal for each of the serving eNB and an adjacent eNB based on the first handover parameter, if a difference between strengths of reference signals for the serving eNB and the adjacent eNB is equal to or less than a threshold value, receives the second handover parameter from the serving eNB, and performs handover to the adjacent eNB based on the second handover parameter.

In accordance with another aspect of the present invention, there is provided a handover apparatus of a serving enhanced Node B (eNB) in a wireless communication system. The handover apparatus includes a transmission/reception unit for performing wireless communication with a User Equipment (UE). An eNB interface unit receives interference power information of an uplink (UL) signal and interference increase/decrease information of the UL signal from a plurality of adjacent eNBs. A memory stores the received interference power information of the UL signal and the received interference increase/decrease information of the UL signal. And a controller identifies adjacent eNBs, for which the received interference power information indicates that interference power of the UL signal is equal to or greater than a threshold value among the plurality of adjacent eNBs, determines whether handover of the UE is delayed and a previously selected target eNB was incorrectly selected based on the interference increase/decrease information received from the identified adjacent eNBs, re-selects a target eNB of the UE as a final target eNB based on the interference increase/decrease information received from the identified adjacent eNBs, and transmits a handover parameter to the UE to perform handover to the re-selected target eNB.

In accordance with yet another aspect of the present invention, there is provided a handover apparatus of a serving enhanced Node B (eNB) in a wireless communication system. The handover apparatus includes a transmission/reception unit for performing wireless communication with User Equipments (UEs). An eNB interface unit receives interference power information of an uplink (UL) signal and the received interference increase/decrease information of the UL signal from multiple adjacent eNBs. A memory stores the received interference power information of the UL signal and the interference increase/decrease information of the UL signal. And a controller selects a first adjacent eNB, for which the received interference power information indicates that interference power of the UL signal is equal to or greater than a threshold value among the multiple adjacent eNBs, as a target eNB, determines whether handover of a UE is delayed and decides whether the UE is to handover to the first adjacent eNB based on the interference increase/decrease information received from the first adjacent eNB, determines whether the target eNB is incorrectly selected and re-selects the target eNB of the UE based on the interference increase/decrease information received from the first adjacent eNB after a determination time of the handover, and transmits a handover parameter to the UE to perform handover to the re-selected target eNB.

Accordingly, the present invention can advantageously enable the UE, which moves at a high rate, to perform the handover without the service interruption. Furthermore, the present invention prevents the generation of the RLF of the UE during the performance of the handover, thereby improving the quality of service.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
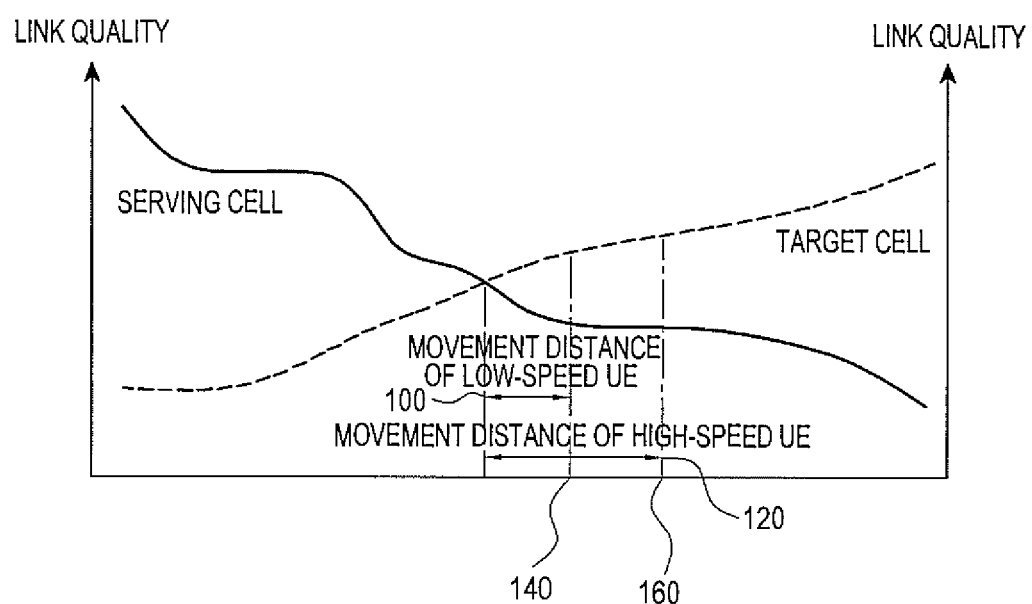
FIG. 1 is a graph illustrating a movement distance of a low-speed UE and a high-speed UE in a conventional wireless communication system.

FIGS. 1 through 10, discussed below, and the various embodiments used to describe the principles of the present disclosure in this patent document are by way of illustration only and should not be construed in anyway to limit the scope of the disclosure. Those skilled in the art will understand that the principles of the present disclosure may be implemented in any suitably arranged wireless communication system. In the following description, a detailed explanation of known related functions and constitutions may be omitted to avoid unnecessarily obscuring the subject matter of the present invention.

The present invention suggests a method and an apparatus for handover in a wireless communication system, e.g. an LTE (Long Term Evolution) communication system. Specifically, the present invention suggests a method and an apparatus which enables a User Equipment (UE) to more efficiently perform the handover without service interruption even when the UE moves at a high rate.

In order to efficiently support the mobility of a high-speed UE located in a cell edge, in the present invention, adjacent eNBs including a target eNB provide interference increase/decrease information of an uplink (UL) signal to a serving eNB. When the serving eNB determines that an interference magnitude by the UL signal increases and the UL signal matches with a resource block pattern allocated to the UE connected with the serving eNB based on UL interference increase/decrease information provided from the adjacent eNBs, the serving eNB provides the UE with a handover parameter that is adequate for the high-speed UE.

For convenience of description, the LTE communication system is exemplified in the present invention, but it is a matter of course that the method and the apparatus for handover according to the present invention can be applied to other communication systems, as well as the LTE communication system. Further, in the present invention, a UE moving at a speed faster than 120 km/h is defined as a high-speed UE and a UE moving at a speed equal to or slower than 120 km/h is defined as a low-speed UE, but a reference for discrimination of the high-speed UE and the low-speed UE may be changed accordingly.

An ICIC (Inter-Cell Interference Coordination) scheme refers to an information exchange scheme through an X2 interface between eNBs for an efficient management of interference of the UE located within a cell. The ICIC scheme can be used, for example, between macro eNBs, a macro eNB and a hotzone eNB, a macro eNB and a pico eNB, a macro eNB and a Femto eNB, a macro eNB and a replay eNB, and such.

Specifically, the ICIC scheme refers to a resource management or scheduling scheme in which the eNBs periodically transmit/receive specific massages related to interference, such that it is possible to efficiently manage a Quality of Service (QoS) and an SINR (Signal-to-Interference plus Noise Ratio) of a UE located in a cell edge of a specific eNB. The ICIC scheme includes a proactive scheme and a reactive scheme.

First, the proactive scheme is a scheme in which one eNB monitors a UL signal and a downlink (DL) signal and transmits information indicating whether a UE is located in a cell edge or whether a UE transmits a signal with power equal to or larger than a threshold value to an adjacent eNB.

HII (High Interference Indication) information, and such, may be included in the information obtained through the monitoring of the UL signal (hereinafter, referred to as the "UL ICIC information"), and RNTP (Relative Narrowband Transmit Power) information, and such, may be included in the information obtained through the monitoring of the DL signal.

In the proactive scheme, interference information measured in the UE, i.e. the information obtained through the monitoring of the UL signal, is not transmitted/received. In contrast, in the reactive scheme, interference information measured in the UE by using a UL signal, e.g. IOI (Interference Overload Indication) information, may be included.

The IOI information generally includes information such as "High", "Mid", and "Low", indicating a strength degree of a current IoT (Interference over Thermal noise). A strength degree of the IoT is measured according to which range among three ranges represented in Table 1 below the IoTu belongs.

TABLE 1

| UL ICIC Information | Indication | Definition |
| --- | --- | --- |
| IOI information | High | Min(High) ≤ current IoT < Max(High) Ex.) Min(High) = −25 dB, Max(High) = −7 dB |
|  | Mid | Min(Medium) ≤ current IoT < Max(Medium) Ex.) Min(Medium) = −7 dB, Max(Medium) = −3 dB |
|  | Low | Min(Low) ≤ current IoT < Max(Low) Ex.) Min(Low) = −3 dB, Max (Low) = 25 dB |

The ICIC scheme is performed during the preparation of the handover. As such, the present invention suggests a method, which uses UL ICIC information obtained according to the performance of the ICIC scheme, such that it is possible to prevent the generation of a problem caused by the handover performance even when the UE moves at a high rate.

Further, the present invention suggests a process, which transmits a handover parameter set for the performance of fast handover to a high-speed UE, such that the high-speed UE may more rapidly perform the handover without the RLF problem.

The handover parameter includes TTT (Time to Trigger), hysteresis, Ocn (a Cell specific offset of a Neighbor cell), Ocs (a Cell specific offset of a Serving cell), and such.

The TTT refers to a time in which a UE has to transmit a result of measurement of a DL reference signal strength, i.e. DL RSRP (Reference Signal Received Power), to a serving eNB, and is used for prevention of a ping pong phenomenon and for the process of the handover of the high-speed UE.

The hysteresis refers to a maximum margin value of signal strength between a serving eNB and adjacent eNBs in the performance of the handover, and is used for prevention of a ping pong phenomenon and for the loading control.

The Ocn refers to an offset value used for increase or decrease of signal strength of an adjacent eNB in the performance of the handover.

The Ocs refers to an offset value used for increase or decrease of signal strength of a serving eNB in the performance of the handover. The Ocn and the Ocs are used for control of a cell coverage.

Additionally, in order to prevent the generation of a problem, such as the RLF of the interruption of a wireless link during the performance of the handover, the handover parameter according to a movement speed of a UE is renewed.

During an initial access or the performance of the handover of the UE, the handover parameter is set according to wireless environment information within a cell. The set handover parameter is included in an RRC connection reconfiguration message and is transmitted to the UE. Then, the UE may perform the handover by using the handover parameter included in the RRC connection reconfiguration message.

In the meantime, the serving eNB may differently set a value of the handover parameter included in the RRC connection reconfiguration message according to a movement speed of the UE. That is, the serving eNB determines whether the movement speed of the UE is high based on the UL ICIC information transmitted from an adjacent eNB; and when it is determined that the movement speed of the UE is high, the serving eNB decreases the values of the TTT, the hysteresis, and the Ocn below each of their current respective values.

Specifically, the serving eNB sets a value of the TTT as a value smaller than a value of the current TTT from among 0, 40, 64, 80, 100, 128, 160, 256, 320, 480, 512, 640, 1024, 1280, 2560, and 5120 ms, and sets a value for the hysteresis as a value smaller than a value of the current hysteresis among 0 to 15 dB (0.5 dB increment). Furthermore, the serving eNB sets a value of the Ocn as a value smaller than a value of the current Ocn among −15 to 15 dB (0.5 dB increment).

In the meantime, when a movement speed of the UE is low, the serving eNB increases a value of the TTT to a value over the current value and decreases the values of the hysteresis and the Ocn to a value below each of the current respective values.

When the handover parameter is reset according to the movement speed of the UE as described above, the serving eNB includes the reset handover parameter into the RRC connection reconfiguration message and transmits it to the UE. Then, the UE performs the handover according to the reset handover parameter without the problem of the RLF, and such.

Hereinafter, the construction of the wireless communication system according to an embodiment of the present invention will be specifically described with reference to FIG. 2.

Figure 2:
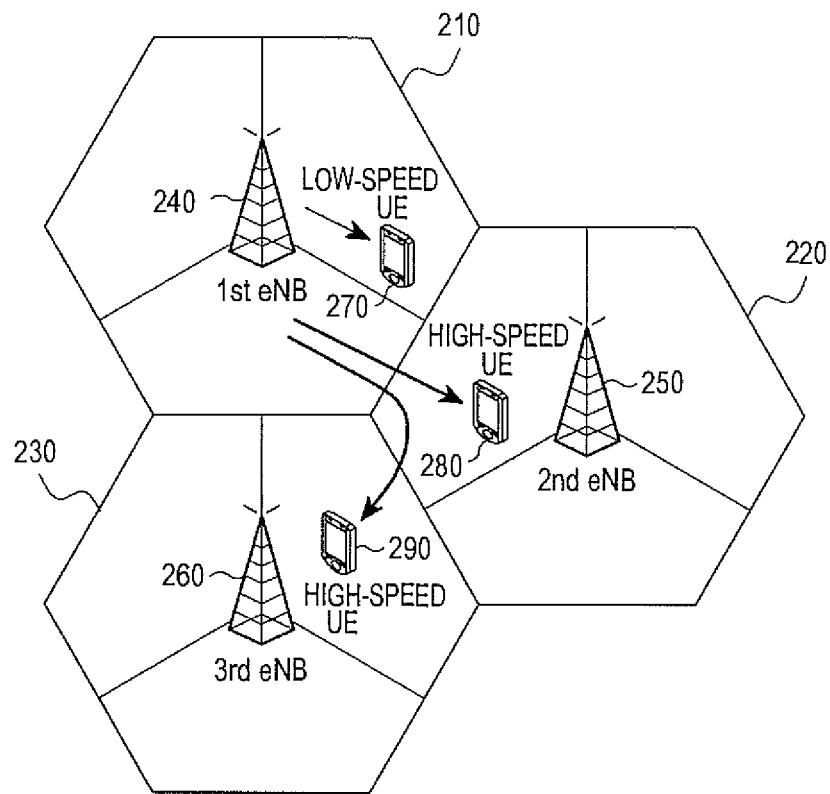
FIG. 2 is a view illustrating a construction of a wireless communication system according to an embodiment of the present invention.

FIG. 2 illustrates the construction of the wireless communication system according to the embodiment of the present invention.

Referring to FIG. 2, the wireless communication system includes a first cell 210, a second cell 220, a third cell 230, a first eNB 240 for managing the first cell 210, a second eNB 250 for managing the second cell 220, a third eNB 260 for managing the third cell 230, and a first UE 270 to a third UE 290 moving from the first cell 210 to another cell, as illustrated, at a different rate.

The first UE 270 is a low-speed UE and the second UE 280 and the third UE 290 are the high-speed UEs. The movement distance of the high-speed UEs of the second and third UEs 280 and 290 is longer than that of the low-speed UE of the first UE 270 during a substantially identical time interval. Furthermore, the third UE 290, in contrast to the second UE 280 may suddenly change its movement route from the second cell 220 to the third cell 230.

When the first UE 270 moves from the first cell 210 to the second cell 220, the first UE 270 performs the conventional handover method. This is because the conventional handover method had been suggested based on the low-speed UE.

Meanwhile, when the second and third UEs 280 and 290 move from the first cell 210 to another cell, the handover may be performed in accordance with the following handover method. That is, the high-speed UE has to perform the handover process by using the UL ICIC information that is generated as described below.

In an embodiment, the generation of the UL ICIC information includes a process of quantizing and segmenting "High" information that may be included in the conventional UL ICIC information as shown in Table 2 below. In Table 2, for example, "High" indicates a strength degree of IoT for a UL signal at the current time and is divided into five levels, but the levels may also be divided into three levels or five levels or more.

TABLE 2

| UL ICIC information | Indication | Definition |
|---|---|---|
| IOI information | High++ | Min(High++) ≤ current IoT < Max(High++) Ex) Min(High++) = −25 dB, Max(High++) = −19 dB |
| | High+ | Min(High+) ≤ current IoT < Max(High+) Ex) Min(High+) = −19 dB, Max(High+) = −16 dB |
| | High | Min(High) ≤ current IoT < Max(High) Ex) Min(High) = −16 dB, Max(High) = −13 dB |
| | High− | Min(High−) ≤ current IoT < Max(High−) Ex) Min(High−) = −13 dB, Max(High−) = −10 dB |
| | High−− | Min(High−−) ≤ current IoT < Max(High−−) Ex) Min(High−−) = −10 dB, Max(High−−) = −7 dB |

When a current IoT strength is not included in ranges of "Mid" and "Low" as represented in aforementioned Table 1, the IOI information in Table 2 may represent one of High++, High+, High, High−, and High−− in binary form of two or three bit information.

In another embodiment, generating the UL ICIC information includes a method of using increase/decrease information of an IoT strength of a UL signal during a specific time interval, i.e. UL IoT increase/decrease information, as IOI information. For example, the UL IoT increase/decrease information may be represented as shown Table 3.

TABLE 3

| UL ICIC information | Indication | Definition | Example (IoTcurrent→IoTnext, Step = 0.6 dB) |
|---|---|---|---|
| UL IoT increase/ decrease information | + (increase) | IoTnext − IoTcurrent ≥ Step | 12.3 dB → 12.9 dB |
| | Hold (No change) | IoTnext − IoTcurrent < Step | 12.3 dB → 12.5 dB |
| | − (decrease) | IoTnext − IoTcurrent ≤− Step | 12.3 dB → 11.7 dB |

In Table 3, IoTcurrent refers to an IoT magnitude measured in a first time and IoTnext refers an IoT magnitude measured in a second time following the first time. Step refers to a reference value used to classify the increase/decrease an IoT magnitude.

For example, in Table 3, the increase or the decrease of the IoT magnitude is decided according to a result of comparison of a difference between the IoT magnitude measured in the first time and the IoT magnitude measured in the second time with the Step value of 0.6 dB, and one of "+", "Hold", and "−" is included in the 101 information according to the decided increase/decrease. Each of the "+", "Hold", and "−" may be represented as two bits of information, but may be three or more bits of information according to an embodiment of the present invention as a matter of course.

The first eNB 240 transmits/receives the UL ICIC information with the adjacent eNBs (i.e. the second and third eNBs 250 and 260) through an eNB interface, such as X2 interface, and stores and manages UL IoT increase/decrease information and current IoT strength information for each of the adjacent eNBs.

The UL IoT increase/decrease information and the current IoT strength information (hereinafter, the "IoT management information") managed by the first eNB 240 may be represented as shown in Table 4 below.

TABLE 4

|  | First eNB 240 | Second eNB 250 | Third eNB 260 |
|---|---|---|---|
| UL IoT increase/ decrease information (embodiment 1) | N/A | +, +, +, +, +, +, +, + | Hold, Hold, . . . , Hold, Hold |
| UL IoT strength information (embodiment 2) |  | High---, High--, High-, High, High+, High++, High+++ | Mid, Mid, Mid, . . . , Mid, High |
| . . . | . . . | . . . | . . . |

The first eNB 240 identifies a UE located in a cell edge. The UE located in the cell edge may be identified in accordance with the RSRP information reported from the UE.

That is, the UE, which transmits information indicating that a difference between the RSRP of the serving eNB (i.e. the first eNB 240) and the RSRP of the adjacent eNB is identical to a threshold value (e.g. −8 dB), may be identified as the UE located in the cell edge. In FIG. 2, for example, the second UE 280 transmits information indicating that the difference of the RSRPs is identical to the threshold value to the first eNB 240.

The first eNB 240 identifies the eNB which transmits the IoT strength information including at least one from among High---, High--, High-, High, High+, High++, and High+++ (hereinafter, collectively referred to as "High"). In contrast, the first eNB 240 may also identify the eNB which transmits information indicating that the IoT strength gradually increases as High-, High, High+, High++, and High+++ during a predetermined time interval.

The first eNB 240 checks the IoT increase/decrease information of the identified eNB for the purpose of determining whether there is a UE for which the handover to the identified eNB has been delayed.

As a result of the check, when the UL IoT increase/decrease information corresponding to the identified eNB includes continuous "+ (increase)" information during the preset time interval, the first eNB 240 determines that there is a UE of which the handover to the identified eNB has been delayed. In another embodiment, when the UL IoT increase/decrease information corresponding to the identified eNB includes "+" information equal to or larger than a threshold value, the first eNB 240 may also determine that there is a UE for which the handover to the identified eNB has been delayed.

In Table 4, the identified eNB may be the second eNB 250 and the third eNB 260. However, only the second eNB 250 transmits the UL IoT increase/decrease information including the continuous "+" information, such that the first eNB 240 determines that there is a UE for which the handover to the second eNB 250 has been delayed.

Then, the first eNB 240 determines whether a UL signal corresponding to the UL IoT increase/decrease information transmitted by the second eNB 250 matches with a UL resource block pattern allocated to the second UE 280 that is the UE located in the cell edge.

When the corresponding UL signal matches with the UL resource block pattern allocated to the second UE 280, the first eNB 240 recognizes that the handover of the second UE 280 has been delayed. That is, the first eNB 240 recognizes the second UE 280 as the high-speed UE.

Next, the first eNB 240 transmits a handover parameter for handover of the high-speed UE to the second UE 280 for the immediate handover of the second UE 280. Specifically, the first eNB 240 decreases the values of TTT, hysteresis, Ocn, and the measured period included in the handover parameter to a value below each of their current values for the handover of the high-speed UE.

Then, the first eNB 240 includes the handover parameter including the TTT, hysteresis, Ocn, and measured period, which have been decreased, respectively, into the RRC connection reconfiguration message and transmits it to the second UE 280.

Then, the second UE 280 measures the RSRP by using the handover parameter included in the RRC connection reconfiguration message and transmits a measured result to the first eNB 240, to perform the handover.

In the meantime, in FIG. 2, a problem may occur in that a UE, such as the third UE 290, which changes the movement route, incorrectly selects a target eNB during the performance of the handover.

The first eNB 240 transmits/receives the ICIC information with the adjacent eNBs of the second and third eNBs 250 and 260 through the X2 interface, and stores and manages the aforementioned UL IoT increase/decrease information and current IoT strength information for each of the adjacent eNBs.

The UL IoT increase/decrease information and the current IoT strength information managed by the first eNB 240 may be represented as Table 5 below.

TABLE 5

|  | first eNB 240 | Second eNB 250 | Third eNB 260 |
|---|---|---|---|
| UL IoT increase/ decrease information | . . . | +, +, +, +, −, −, −, − | Hold, Hold, Hold, Hold, +, +, +, + |
| IoT strength information | . . . | High--, High--, High-, High, High-, Mid, Mid | High, High, High+ |
| . . . | . . . | . . . | . . . |

The first eNB 240 identifies the UE located in the cell edge. When the third UE 290 transmits information indicating that a difference between the RSRP of the first eNB 240 and the RSRP of the adjacent eNB is identical to a threshold value to the first eNB 240, the first eNB 240 identifies the third UE 290 as the UE located in the cell edge.

The first eNB 240 identifies eNBs which transmit the IoT strength information including at least one "High" among the IoT management information. In Table 5, the second eNB 250 and the third eNB 260 may be identified.

The first eNB 240 checks the UL IoT increase/decrease information of the identified eNBs for determining whether there is a UE for which the handover has been delayed.

As a result of the check, when the UL IoT increase/decrease information corresponding to the identified eNBs includes a value forming an inflection point, for example, continuous "+" information and continuous "−" information, during the preset time interval, the first eNB 240 estimates that a target eNB for the handover may be incorrectly selected, resulting in the incorrect performance of the handover.

Specifically, the first eNB 240 first determines whether the UL IoT increase/decrease information of the second eNB 250 includes continuous "+" information and then determines whether a UL signal corresponding to the UL IoT increase/decrease information of the second eNB 250 matches with a UL resource block pattern allocated to the third UE 290.

When the UL signal corresponding to the "+" information of the UL IoT increase/decrease information of the second eNB 250 matches with the UL resource block pattern allocated to the third UE 290, the first eNB 240 recognizes that the handover of the third UE 290 to the second eNB 250 has been delayed and decides the second eNB 250 as a target eNB.

Next, the first eNB 240 sets the handover parameter for the immediate handover to the second eNB 250 and then transmits the set handover parameter to the third UE 290.

However, as illustrated in FIG. 2, the second eNB 250 moves to third cell 230 through the second cell 220, such that the second eNB 250 should not be the target eNB. Therefore, when the UL IoT increase/decrease information includes a value forming an inflection point, the first eNB 240 may estimate that a target eNB for the handover may be incorrectly selected, resulting in the incorrect performance of the handover.

In the meantime, "+" information is included in the UL IoT increase/decrease information of the third eNB 260 at the time in which "−" information is included in the UL IoT increase/decrease information of the second eNB 250. Therefore, the first eNB 240 determines whether a UL signal corresponding to "+" information of the UL IoT increase/decrease information of the third eNB 260 matches with the UL resource block pattern allocated to the third UE 290. Then, when the UL signal corresponding to "+" information of the UL IoT increase/decrease information of the third eNB 260 matches with the UL resource block pattern allocated to the third UE 290, the first eNB 240 recognizes that the second eNB 250 has been incorrectly selected as the target eNB and determines that the third eNB 260 is the target eNB.

Then, the first eNB 240 sets the handover parameter for the immediate handover to the third eNB 260 and transmits the set handover parameter to the third UE 290.

Therefore, even when the third UE 290 changes the movement route, it is possible to effectively perform the handover to the corresponding target eNB.

Hereinafter, the construction of an eNB according to an embodiment of the present invention will be described with reference to FIG. 3.

Figure 3:
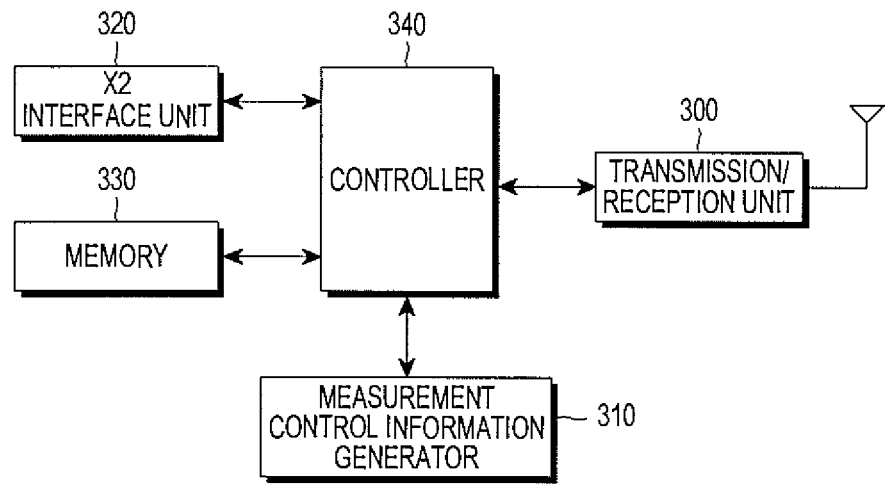
FIG. 3 illustrates a block diagram of an eNB according to an embodiment of the present invention.

FIG. 3 illustrates a block diagram of the eNB according to an embodiment of the present invention.

Referring to FIG. 3, the eNB includes a transmission/reception unit 300, a measurement control information generator 310, an X2 interface unit 320, a memory 330, and a controller 340.

The transmission/reception unit 300 performs a wireless communication function of the eNB. The transmission/reception unit 300 receives a UL signal from a UE and transmits a DL signal to the UE.

The measurement control information generator 310 sets a handover parameter and generates a measurement control information message (e.g. an RRC connection reconfiguration message) including the set handover parameter.

The X2 interface unit 320 communicates with an adjacent eNB. The X2 interface unit 320 may transmit/receive UL ICIC information, such as UL IoT increase/decrease information and current IoT strength information, with the adjacent eNB.

The memory 330 stores the UL IoT increase/decrease information and current IoT strength information received through the X2 interface unit 320 for each eNB.

The controller 340 controls a general operation of the eNB. The controller 340 also controls the transmission/reception unit 300, the measurement control information generator 310, the X2 interface unit 320, and the memory 330, and performs the handover process for the high-speed UE according to an embodiment of the present invention.

In FIG. 3, the measurement control information generator 310 and the controller 340 are configured as independent elements; however, in some embodiments, the controller 340 may perform an operation of the measurement control information generator 310.

Next, the construction of a UE according to an embodiment of the present invention will be described with reference to FIG. 4.

Figure 4:
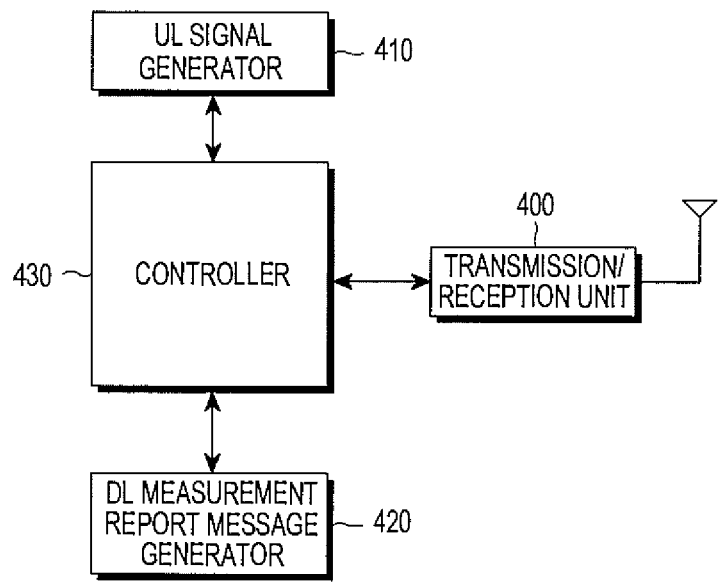
FIG. 4 illustrates a block diagram of a UE according to an embodiment of the present invention.

FIG. 4 illustrates a block diagram of the UE according to an embodiment of the present invention.

Referring to FIG. 4, the UE includes a transmission/reception unit 400, a UL signal generator 410, a DL measurement report message generator 420, and a controller 430.

The transmission/reception unit 400 performs a wireless communication function of the UE. The transmission/reception unit 400 receives a DL signal from an eNB and transmits a UL signal to the eNB.

The UL signal generator 410 receives UL resource allocation information from the eNB through the transmission/reception unit 400 and generates a UL signal according to the received resource allocation information.

When a reference signal, such as a pilot signal, is received from the eNB through the transmission/reception unit 400, the DL measurement report message generator 420 measures RSRP. The DL measurement report message generator 420 also generates a DL measurement report message for reporting the measurement result of the RSRP to the eNB. The DL measurement report message is transmitted to the eNB through the transmission/reception unit 400.

The controller 430 controls a general operation of the UE. The controller 430 controls the transmission/reception unit 400, the UL signal generator 410, and the DL measurement report message generator 420. When the UE moves at a high rate, the controller 320 performs the handover process according to an embodiment of the present invention.

In FIG. 4, the UL signal generator 410 and the DL measurement report message generator 420 are configured as independent elements; however, in some embodiments, the controller 430 may perform the operations of the UL signal generator 410 and the DL measurement report message generator 420.

Hereinafter, a handover process of the eNB and the UE constructed as above will be specifically described.

Figure 5:
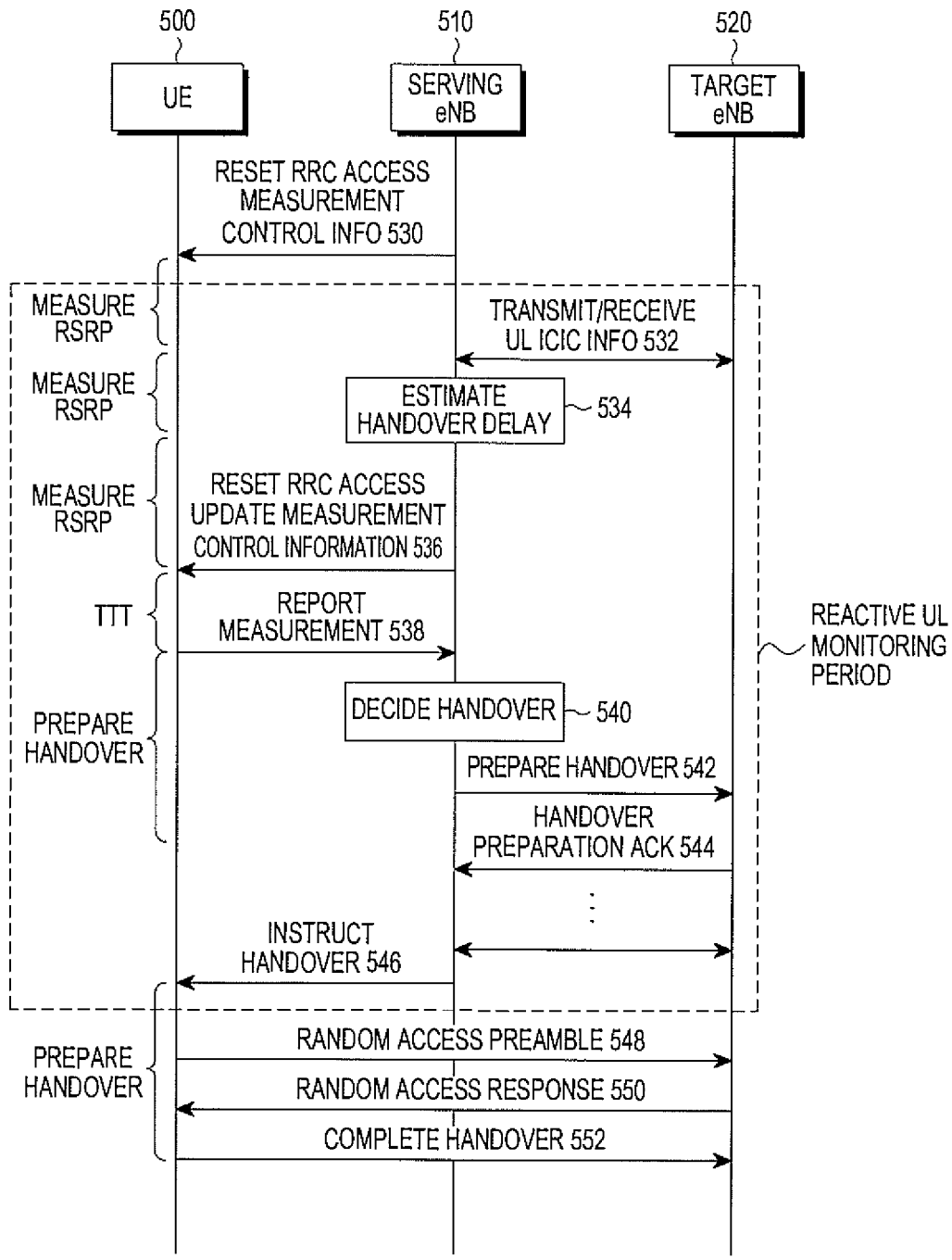
FIG. 5 illustrates a signal flow in a handover process for a high-speed UE according to an embodiment of the present invention.

FIG. 5 illustrates a signal flow in the handover process for a high-speed UE according to an embodiment of the present invention.

Referring to FIG. 5, when a UE 500 enters (or re-enters) a network of a serving eNB 510, the serving eNB 510 transmits an RRC connection reconfiguration message 530 to the UE 500. The RRC connection reconfiguration message includes a handover parameter, serving as measurement control information, set in accordance with a wireless communication environment of a cell.

The serving eNB 510 transmits/receives UL ICIC information 532 with adjacent eNBs including a target eNB 520. Herein, the serving eNB 510 continuously transmits/receives UL ICIC information 532 during a reactive UL monitoring period illustrated in FIG. 5.

As such, the serving eNB 510 may obtain UL IoT increase/decrease information and current IoT strength information for each of the eNBs during the reactive UL monitoring period.

Then, the serving eNB 510 identifies an eNB, for which the current IoT strength information is indicated as "High" and the number of UL IoT increase/decrease information including "+" information is equal to or larger than a threshold value, among the adjacent eNBs, as the target eNB 520.

In block 534, the serving eNB 510 determines that the handover of the UE 500 has been delayed and updates the handover parameter of the measurement control information such that the handover parameter matches with the high-speed UE. That is, the serving eNB 510 decreases a value of TTT, hysteresis, Ocn, and measurement period included in the handover parameter to a value below each of the respective current values.

Then, the serving eNB 510 includes the handover parameter including the TTT, hysteresis, Ocn, and measurement period which have the decreased value, respectively, into the RRC connection configuration message 536 and transmits it to the UE 500.

The UE 500 measures RSRP during an RSRP measurement period and then transmits a measurement report message 538 to the serving eNB 510 by using the handover parameter included in the RRC connection configuration message.

In block 540, the serving eNB 510 decides whether UE 500 should handover to the target eNB 520 in accordance with the RSRP measurement result included in the measurement report message.

Upon determining that UE 500 should handover to the target eNB 520, the serving eNB 510 transmits a handover preparation message 542 to the target eNB 520. Then, when the serving eNB 510 receives a handover preparation ACK message 544 from the target eNB 520, the serving eNB 510 transmits a handover command message 546 to the UE 500.

Then, the UE 500 transmits a random access preamble message 548 for adjustment of synchronization of the UL and the DL to the target eNB 520. Then, when the UE 500 receives a random access response 550 from the target eNB 520, the UE 500 transmits a handover confirm message 552 to the target eNB 520.

According to the aforementioned process, the UE 500 may perform the handover without service interruption even when the UE 500 moves at a high rate.

Hereinafter, two types of handover processes for a high-speed UE that changes a movement route according to an embodiment of the present invention will be specifically described.

The first type of the handover process will be described with reference to FIG. 6.

Figure 6:
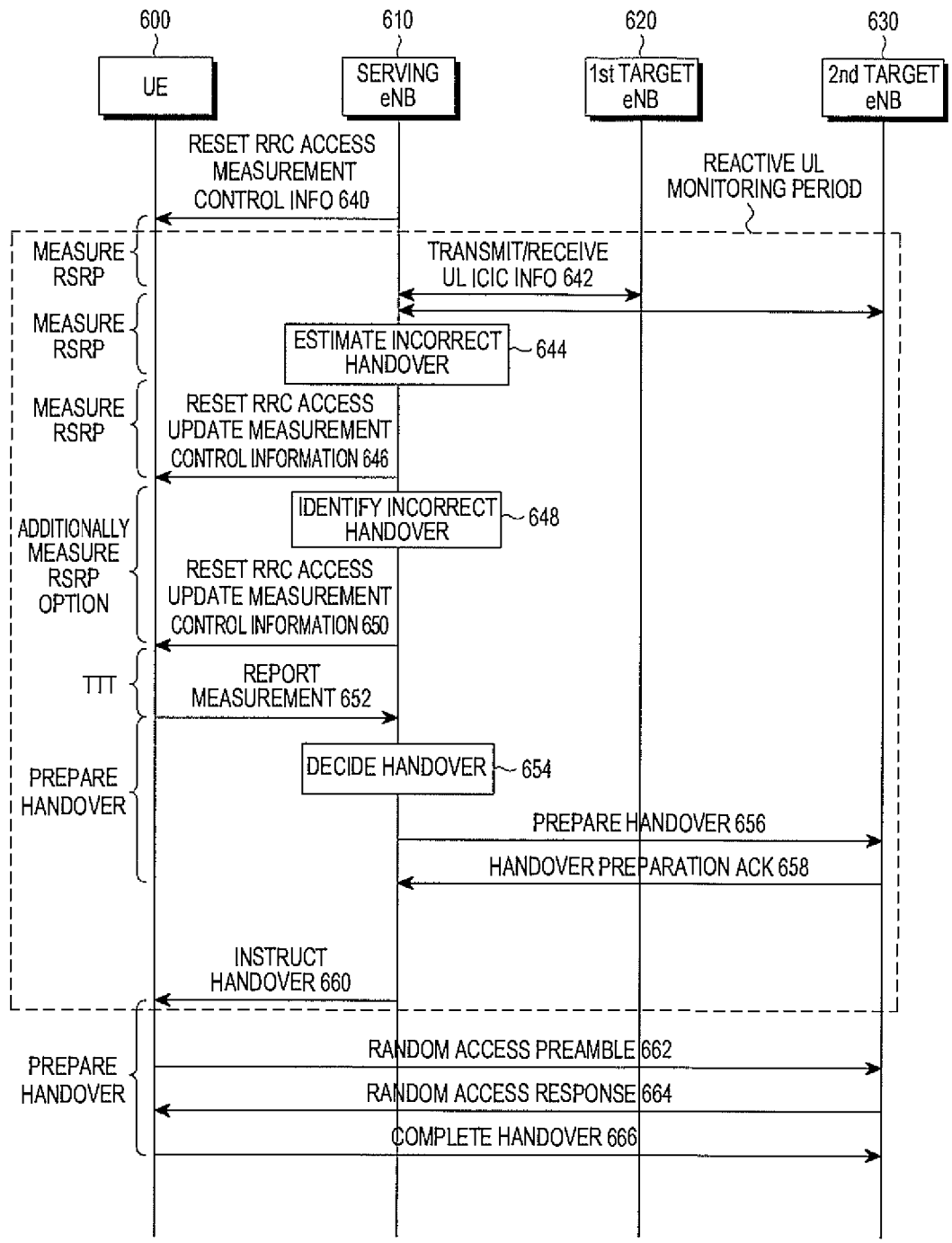
FIG. 6 illustrates a signal flow of the handover process for a high-speed UE that changes a movement route, according to an embodiment of the present invention.

FIG. 6 illustrates a signal flow for the first type of the handover process for a high-speed UE, which changes a movement route, according to an embodiment of the present invention.

Referring to FIG. 6, when a UE 600 enters (or re-enters) a network of a serving eNB 610, the serving eNB 610 transmits an RRC connection reconfiguration message 640 to the UE 600. The RRC connection reconfiguration message 640 includes a handover parameter, serving as measurement control information, set in accordance with a wireless communication environment of a cell.

The serving eNB 610 transmits/receives UL ICIC information 642 with adjacent eNBs of a first target eNB 620 and a second target eNB 630. Herein, the serving eNB 610 continuously transmits/receives UL ICIC information 642 during a reactive UL monitoring period illustrated in FIG. 6. As such, the serving eNB 610 may obtain UL IoT increase/decrease information and current IoT strength information for each of the eNBs during the reactive UL monitoring period.

The serving eNB 610 identifies eNBs transmitting the IoT strength information including at least one "High" among IoT management information and checks the UL IoT increase/decrease information of the identified eNBs. FIG. 6 exemplifies an embodiment in which the identified eNBs are the first target eNB 620 and the second target eNB 630 for description.

The serving eNB 610 first determines that the UL IoT increase/decrease information of the first target eNB 620 includes continuous "+" information or "+" information equal to or larger than a threshold value and then determines whether a UL signal corresponding to the UL IoT increase/decrease information of the first target eNB 620 matches with a UL resource block pattern allocated to the UE 600.

When the UL signal corresponding to the UL IoT increase/decrease information of the first target eNB 620 matches with the UL resource block pattern allocated to the UE 600, the serving eNB 610 recognizes that the handover of the UE 600 to the first target eNB 620 has been delayed and selects the first target eNB 620 as a target eNB of the UE 600.

However, when the UL IoT increase/decrease information of the first target eNB 620 includes a value forming an inflection point, for example, when the UL IoT increase/decrease information of the first target eNB 620 includes continuous "+" information followed by continuous "−" information, the serving eNB 610 may estimate that the target eNB has been incorrectly selected, resulting in the incorrect performance of the handover in block 644.

The serving eNB 610 updates measurement control information (i.e. a handover parameter) such that the UE 600 may immediately perform the handover to the first target eNB 620 and then transmits the updated measurement control information 646 to the UE 600.

In the meantime, "+" information may be included in the UL IoT increase/decrease information of the second target eNB 630 at the time in which "−" information is included in the UL IoT increase/decrease information of the first target eNB 620. Therefore, the serving eNB 610 determines whether a UL signal corresponding to "+" information of the UL IoT increase/decrease information of the second target eNB 630 matches with a UL resource block pattern allocated to the UE 600.

When the UL signal corresponding to "+" information of the UL IoT increase/decrease information of the second target eNB 630 matches with the UL resource block pattern allocated to the UE 600, the serving eNB 610 recognizes that the first target eNB 620 is incorrectly selected as the target eNB and identifies that the handover is incorrect in block 648. Then, the serving eNB 610 selects the second target eNB 630 as the target eNB.

The serving eNB 610 updates measurement control information such that the UE 600 may immediately perform the handover to the second target eNB 630 and then transmits the updated measurement control information 650 to the UE 600.

Then, the UE 600 measures RSRP in accordance with the updated measurement control information and transmits a measurement report message 652 including the measurement result to the serving eNB 610.

The contents of elements 654 to 666 of FIG. 6 are similar with those of elements 540 to 552 of FIG. 5, such that their detailed descriptions will be omitted.

Next, the second type of the handover process will be described with reference to FIG. 7.

Figure 7:
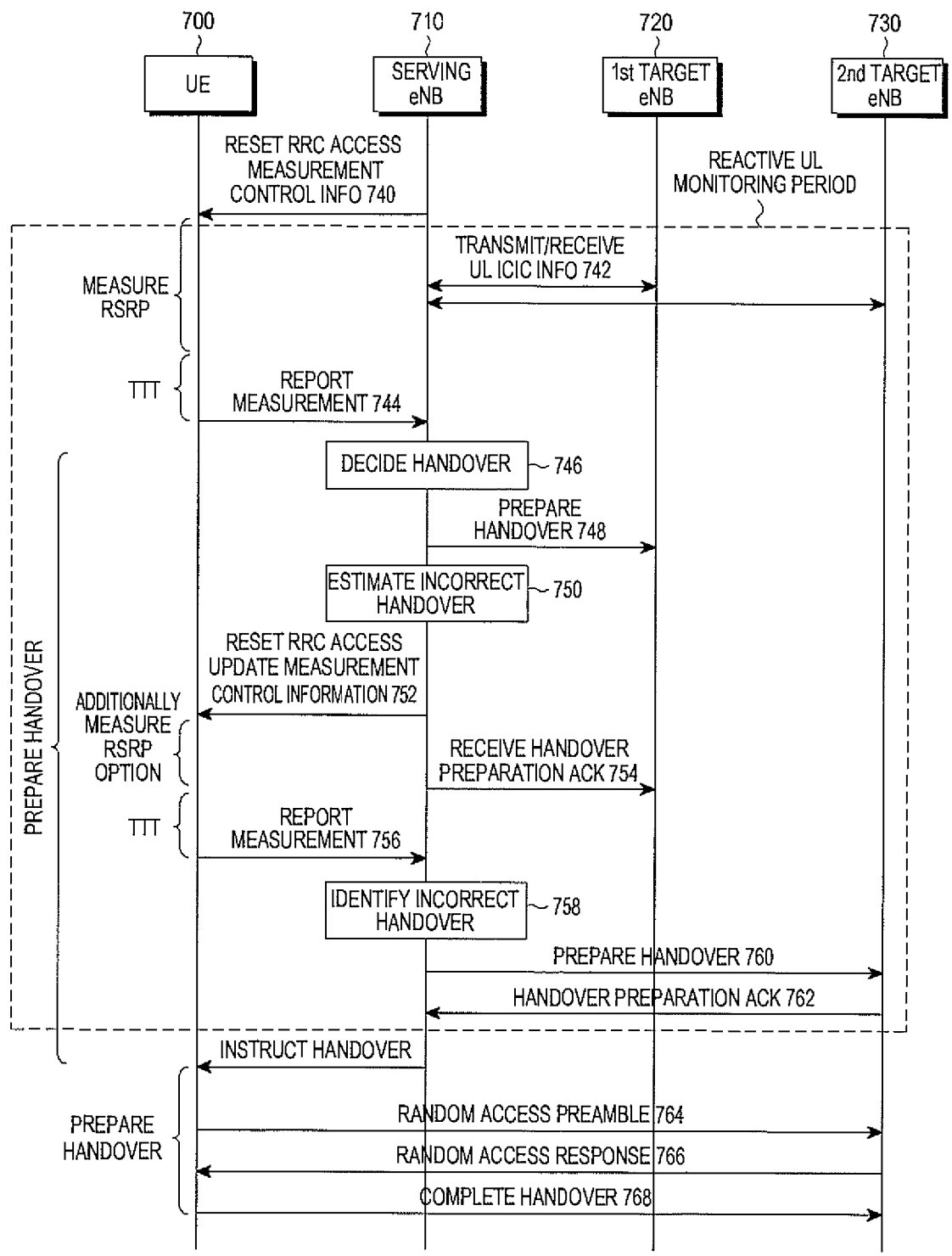
FIG. 7 illustrates a signal flow of the handover process for a high-speed UE that changes a movement route, according to an embodiment of the present invention.

FIG. 7 illustrates a signal flow of the handover process for a high-speed UE that changes a movement route, according to an embodiment of the present invention.

Referring to FIG. 7, when a UE 700 enters (or re-enters) a network of a serving eNB 710, the serving eNB 710 transmits an RRC connection reconfiguration message 740 to the UE 700. The RRC connection reconfiguration message 740 includes a handover parameter, serving as measurement control information, set in accordance with a wireless communication environment of a cell.

The serving eNB 710 transmits/receives UL ICIC information 742 with adjacent eNBs of a first target eNB 720 and a second target eNB 730. Herein, the serving eNB 710 continuously transmits/receives UL ICIC information 742 during a reactive UL monitoring period illustrated in FIG. 7. As such, the serving eNB 710 may obtain UL IoT increase/decrease information and current IoT strength information for each of the eNBs during the reactive UL monitoring period.

The UE 700 measures RSRP based on the received handover parameter and transmits a measurement result message 744 including the measurement result to the serving eNB 710. In block 746, the serving eNB 710 determines the handover of the UE 700 to the first target eNB 720 in accordance with the measurement result. Then, the serving eNB 710 transmits a handover preparation message 748 to the first target eNB 720.

When the UL IoT increase/decrease information of the first target eNB 720 includes a value forming an inflection point, the serving eNB 710 estimates that the target eNB may be incorrectly selected, resulting in the incorrect performance of the handover in block 750.

The serving eNB 710 updates measurement control information (i.e. a handover parameter) such that the UE 700 may immediately perform the handover to the first target eNB 720 and then transmits the updated measurement control information 752 to the UE 700. Then, the serving eNB 710 transmits a handover preparation ACK message 754 to the first target eNB 720.

The UE 700 measures RSRP in accordance with the updated measurement control information and transmits a measurement report message 756 including the measurement result to the serving eNB 710.

When "+" information is included in the UL IoT increase/decrease information of the second target eNB 730 at the time in which "−" information is included in UL IoT increase/decrease information of the first eNB 720, the serving eNB 710 determines whether a UL signal corresponding to "+" information of the UL IoT increase/decrease information of the second target eNB 730 matches with a UL resource block pattern allocated to the UE 700.

Then, when the UL signal corresponding to "+" information of the UL IoT increase/decrease information of the second target eNB 730 matches with the UL resource block pattern allocated to the UE 700, the serving eNB 710 recognizes that the first target eNB 720 is incorrectly selected as the target eNB and identifies that the handover is incorrect in block 758. After the serving eNB 710 selects the second target eNB 730 as the target eNB, the serving eNB 710 performs the handover to the second target eNB 730.

The contents of elements 760 to 768 of FIG. 7 are similar with those of elements 542 to 552 of FIG. 5, such that their detailed descriptions will be omitted.

Hereinafter, an operation process of a serving eNB according to an embodiment of the present invention will be described with reference to FIG. 8.

Figure 8:
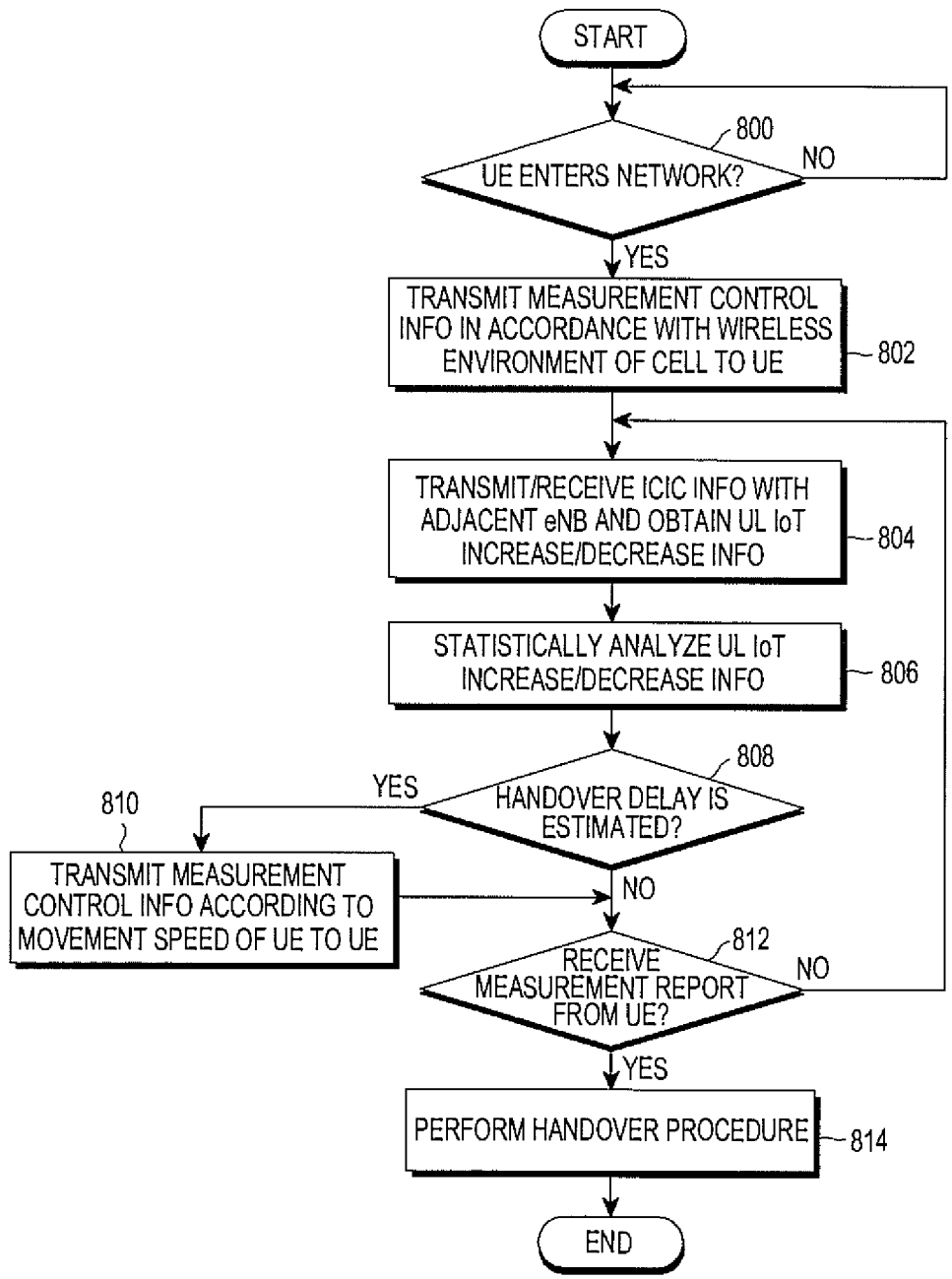
FIG. 8 illustrates a process of a serving eNB according to an embodiment of the present invention.

FIG. 8 illustrates a process of the serving eNB according to an embodiment of the present invention.

Referring to FIG. 8, when a UE enters a network in block 800, the serving eNB transmits an RRC connection reconfiguration message including measurement control information according to a wireless communication environment of a cell to the UE in block 802.

The serving eNB transmits/receives ICIC information with at least one adjacent eNB in order to obtain IoT strength information for each of multiple measurement time points within a preset time interval, and obtains UL IoT increase/decrease information for each of the multiple measurement time points in block 804.

In block 806, the serving eNB analyzes statistical data of the UL IoT increase/decrease information for the preset time interval. In block 808, the serving eNB determines whether the delay of the handover of the UE is estimated based on the analysis result.

Specifically, the serving eNB determines whether there is a candidate eNB, which transmits interference power information indicating that interference power of the UL signal is equal to or larger than a threshold value by at least a number of reference times during the preset time interval, among at least one adjacent eNB.

When there is at least one candidate eNB, the serving eNB determines whether there is a UE receiving a service from an eNB that is different from the candidate eNB within a cell of the candidate eNB by using interference increase/decrease information received from the candidate eNB.

When there is a UE within the cell of the candidate eNB, the serving eNB determines whether a UL signal corresponding to the interference increase/decrease information received from the candidate eNB matches with the UL resource allocation information allocated to the UE which receives the service from the serving eNB. When the UL signal corresponding to the interference increase/decrease information received from the candidate eNB matches with UL resource allocation information allocated to the UE, the serving eNB estimates that the handover of the UE is delayed.

In block 810, the serving eNB transmits measure control information in accordance with a movement speed of the UE to the UE. That is, the serving eNB recognizes that the movement speed of the UE is high and transmits the handover parameter, serving as the measurement control information, corresponding to the high-speed UE to the UE such that the UE may perform the handover to the candidate eNB.

Next, the serving eNB determines whether a measurement report is received from the UE in block 812. The measurement report includes RSRP information measured by using the measurement control information.

When the serving eNB receives the measurement report, the serving eNB performs the handover procedure in block 814. Alternatively, if the measurement report is not received from the UE, the process returns to block 804.

Hereinafter, an operation process of an adjacent eNB according to an embodiment of the present invention will be described with reference to FIG. 9.

Figure 9:
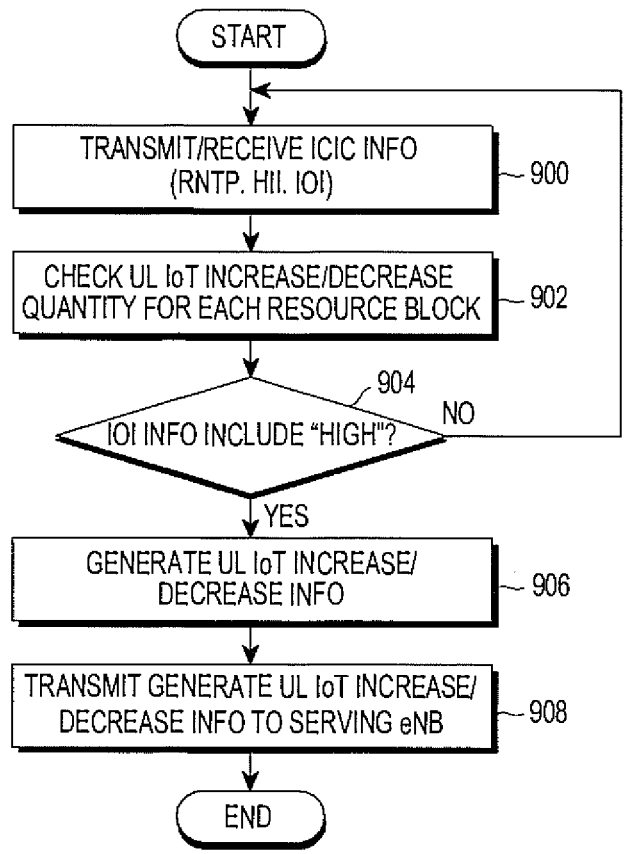
FIG. 9 illustrates a process of an adjacent eNB according to an embodiment of the present invention.

FIG. 9 illustrates a process of the adjacent eNB according to an embodiment of the present invention.

Referring to FIG. 9, the adjacent eNB transmits/receives ICIC information including RNTP, HII, IO, and such, with a serving eNB in block 900.

In block 902, the adjacent eNB checks a magnitude of UL IoT increase/decrease for each resource block. In block 904, the adjacent eNB determines whether IOI information at the time of the check of the magnitude of UL IoT increase/decrease includes "High". When the IOI information at the time of the check of the magnitude of UL IoT increase/decrease includes "High", the adjacent eNB generates UL IoT increase/decrease information in block 906. In block 908, the adjacent eNB transmits the generated UL IoT increase/decrease information to the serving eNB. Alternatively, when the IOI information at the time of the check of the magnitude of the UL IOT increase/decrease does not include "High", the adjacent eNB returns to block 900.

Next, an operation process of a UE according to an embodiment of the present invention will be described with reference to FIG. 10.

Figure 10:
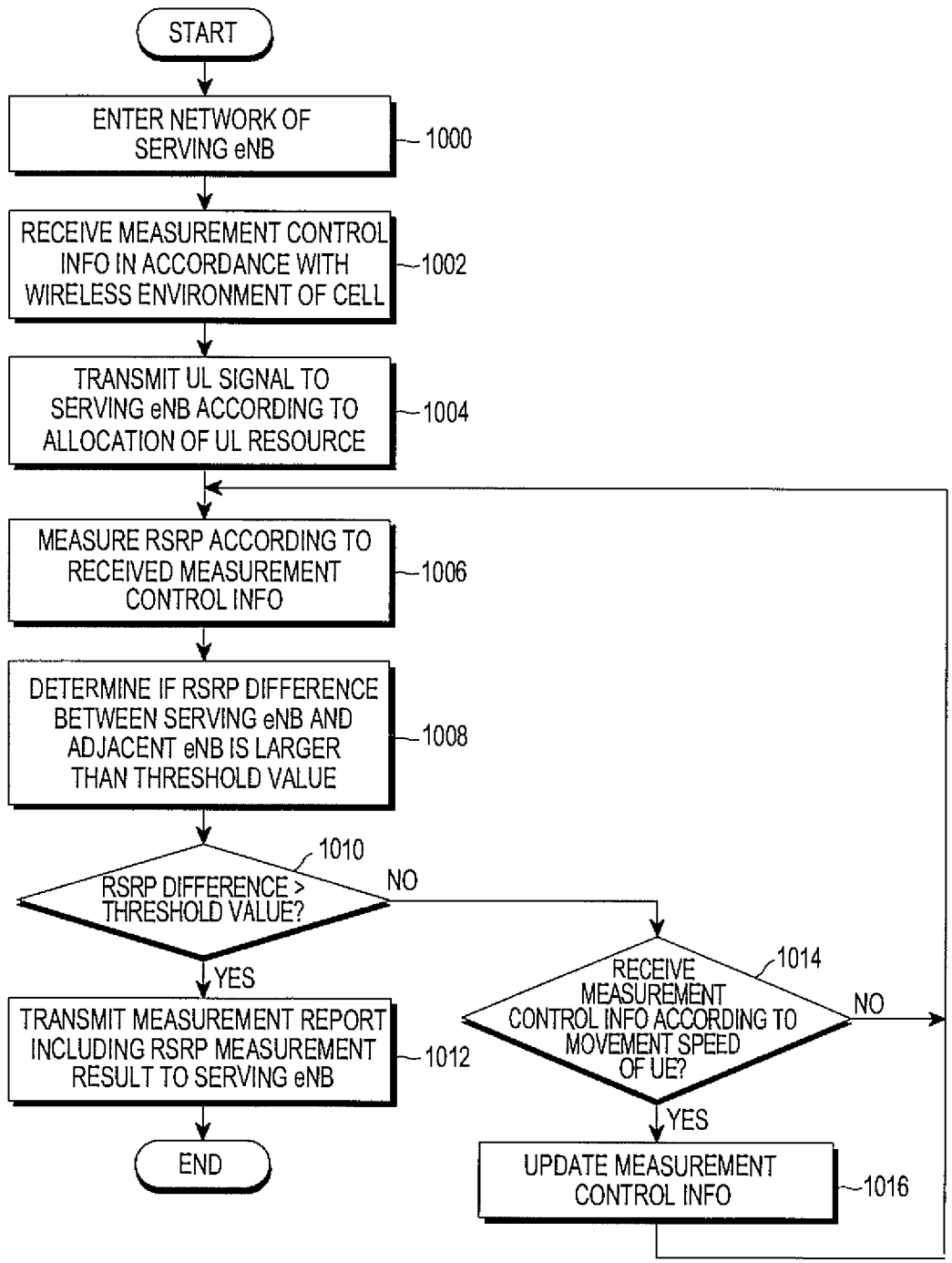
FIG. 10 illustrates a process of a UE according to an embodiment of the present invention.

FIG. 10 illustrates a process of the UE according to an embodiment of the present invention.

Referring to FIG. 10, when the UE enters (or re-enters) a network of a serving eNB in block 1000, the UE receives measurement control information according to a wireless communication environment of a cell from the serving eNB in block 1002.

In block 1004, the UE transmits the UL signal in accordance with UL resource allocation of the serving eNB. In block 1006, the UE measures RSRP in accordance with the received measurement control information. At this time, the UE may measure RSRP of an adjacent eNB, as well as RSRP of the serving eNB.

The UE determines whether a difference between the measured RSRP of the serving eNB and the measured RSRP of the adjacent eNB is larger than a threshold value in block 1008. When the difference between the measured RSRP of the serving eNB and the measured RSRP of the adjacent eNB is larger than the threshold value in block 1010, the UE transmits a measurement report message including an RSRP measurement result to the serving eNB in block 1012.

However, when the difference between the measured RSRP of the serving eNB and the measured RSRP of the adjacent eNB is equal to or less than the threshold value in block 1010, the UE determines whether measurement control information according to a movement speed of the UE is received in block 1014.

When the measurement control information according to the movement speed of the UE is not received in block 1014, the UE returns to block 1006. Alternatively, when the measurement control information according to the movement speed of the UE is received in block 1014, the UE updates the measurement control information in block 1016 before returning to block 1006.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for handover of a serving enhanced Node B (eNB) in a wireless communication system, the method comprising:

receiving, from at least one adjacent eNB, interference power information of an uplink (UL) signal and interference variation information indicating that an interference of the UL signal is increased or decreased;

selecting an adjacent eNB, for which the received interference power information indicates that interference power of the UL signal is equal to or greater than a threshold value, as a target eNB for a User Equipment (UE) among the at least one adjacent eNB;

determining whether an interference of the target eNB is increased based on the interference variation information received from the target eNB;

if the interference of the target eNB is increased, determining that the handover of the UE is delayed; and transmitting a handover parameter to the UE to perform handover to the target eNB;

wherein the interference of the target eNB is an interference generated by a UL signal of the UE.

2. The method as claimed in claim 1, wherein selecting the target eNB comprises identifying an adjacent eNB, for which the received interference power information indicates that interference power of the UL signal is equal to or greater than the threshold value in at least a reference number of times during a preset time interval among the at least one adjacent eNB, as the target eNB.

3. The method as claimed in claim 1, wherein determining whether the interference of the target eNB is increased comprises:

determining whether an interference increase pattern by the UL signal of the UE in the target eNB corresponds to a UL resource allocation pattern associated with the UE, based on the interference variation information received from the target eNB; and if the interference increase pattern corresponds to the UL resource allocation pattern, determining that the handover of the UE to the target eNB has been delayed.

4. A method for handover of an adjacent enhanced Node B (eNB) in a wireless communication system, the method comprising:

transmitting interference power information of an uplink (UL) signal to a serving eNB;

determining whether interference power of the UL signal is equal to or greater than a threshold value;

if the interference power of the UL signal is equal to or greater than the threshold value, generating interference variation information indicating that an interference of the UL signal is increased or decreased;

transmitting the interference variation information to the serving eNB; and if a request for handover for a User Equipment (UE) is received from the serving eNB, performing a handover procedure with the UE, wherein the interference variation information is used to determine whether the handover of the UE is delayed, and includes increase or decrease information of an interference generated by a UL signal of the UE.

5. The method as claimed in claim 4, wherein generating the interference variation information comprises:

selecting a level corresponding to the interference power of the UL signal, which is equal to or greater than a threshold value, among a plurality of power levels; and generating the interference variation information based on the selected level.

6. The method as claimed in claim 4, wherein, if the interference variation information includes information according to an interference increase pattern by the UL signal of the UE, a handover delay of the UE is determined, and wherein the interference increase pattern corresponds to a UL resource allocation pattern associated with the UE.

7. A method for handover of a User Equipment (UE) in a wireless communication system, the method comprising:

receiving a first handover parameter set in accordance with a wireless environment of a cell from a serving enhanced Node B (eNB);

measuring a strength of a reference signal for each of the serving eNB and an adjacent eNB based on the first handover parameter;

if a difference between strengths of reference signals for the serving eNB and the adjacent eNB is equal to or less than a threshold value, receiving a second handover parameter set based on a movement speed of the UE from the serving eNB; and performing handover to the adjacent eNB based on the second handover parameter, wherein the second handover parameter comprises a handover parameter that is associated with interference power information of an uplink (UL) signal and interference variation information indicating that an interference of the UL signal is increased or decreased, received from the adjacent eNB, and wherein the interference variation information is used to determine whether the handover of the UE is delayed, and includes increase or decrease information of an interference generated by a UL signal of the UE.

8. The method as claimed in claim 7, wherein performing the handover to the adjacent eNB comprises:
measuring the strength of the reference signal for each of the serving eNB and the adjacent eNB based on the second handover parameter;
transmitting information about the strength of the reference signal for each of the serving eNB and the adjacent eNB measured based on the second handover parameter to the serving eNB; and
if a message to perform handover from the serving eNB to the adjacent eNB is received, performing handover to the adjacent eNB.

9. The method as claimed in claim 7, wherein, if the interference variation information includes information according to an interference increase pattern by the UL signal of the UE, a handover delay of the UE is determined, and
wherein the interference increase pattern corresponds to a UL resource allocation pattern associated with the UE.

10. A method for handover of a serving enhanced Node B (eNB) in a wireless communication system, the method comprising:
receiving, from a plurality of adjacent eNBs, interference power information of an uplink (UL) signal and interference variation information indicating that an interference of the UL signal is increased or decreased;
identifying adjacent eNBs, for which the received interference power information indicates that interference power of the UL signal is equal to or greater than a threshold value among the plurality of adjacent eNBs;
determining whether handover of a User Equipment (UE) is delayed and a previously selected target eNB was incorrectly selected based on the interference variation information received from the identified adjacent eNBs;
re-selecting a target eNB of the UE as a final target eNB based on the interference variation information received from the identified adjacent eNBs; and
transmitting a handover parameter to the UE to perform handover to the final target eNB.

11. The method as claimed in claim 10, wherein determining whether the handover of the UE is delayed and the previously selected target eNB was incorrectly selected comprises:
determining whether a UL signal corresponding to interference variation information received from a first adjacent eNB among the identified eNBs corresponds to UL resource allocation information associated with the UE;
if the UL signal corresponding to the interference variation information received from the first adjacent eNB corresponds to the UL resource allocation information associated with the UE, determining whether handover of the UE to the first adjacent eNB as the target eNB has been delayed; and
if the interference variation information received from the first adjacent eNB includes at least a first predetermined number of increase information indicating that the interference power of the UL signal is equal to or greater than the threshold value followed by at least a second predetermined number of decrease information indicating that the interference power of the UL signal is less than the threshold value, determining that the first adjacent eNB was incorrectly selected as the previously selected target eNB.

12. The method as claimed in claim 11, wherein re-selecting the target eNB comprises selecting a second adjacent eNB, for which the received interference variation information indicates that the interference power of the UL signal at a time corresponding to the decrease information of the first adjacent eNB is equal to or greater than the threshold value among the identified eNBs, as the final target eNB.

13. A method for handover of a serving enhanced Node B (eNB) in a wireless communication system, the method comprising:
receiving, from a plurality of adjacent eNBs, interference power information of an uplink (UL) signal and interference variation information indicating that an interference of the UL signal is increased or decreased;
selecting a first adjacent eNB, for which the received interference power information indicates that interference power of the UL signal is equal to or greater than a threshold value among the plurality of adjacent eNBs, as a target eNB;
determining whether handover of a User Equipment (UE) is delayed and deciding whether the UE is to handover to the first adjacent eNB based on the interference variation information received from the first adjacent eNB;
determining whether the target eNB is incorrectly selected and re-selecting the target eNB of the UE based on the interference variation information received from the first adjacent eNB after a determination time of the handover; and
transmitting a handover parameter to the UE to perform handover to the re-selected target eNB.

14. The method as claimed in claim 13, wherein determining whether the handover of the UE is delayed comprises:
determining whether the UL signal corresponding to the interference variation information received from the first adjacent eNB corresponds to UL resource allocation information associated with the UE; and
if the UL signal corresponding to the interference variation information received from the first adjacent eNB corresponds to the UL resource allocation information associated with the UE, determining that the handover of the UE to the first adjacent eNB serving as the target eNB has been delayed.

15. The method as claimed in claim 13, wherein re-selecting the target eNB comprises:
if the interference variation information received from the first adjacent eNB includes at least a predetermined number of decrease information indicating that the interference power of the UL signal is less than a threshold value after the determination time of the handover, determining that the first adjacent eNB is incorrectly selected as the target eNB; and
if a second adjacent eNB, for which the received interference variation information includes increase information indicating that the interference power of the UL signal is equal to or greater than a threshold value after the determination time of the handover, is identified among the plurality of adjacent eNBs, selecting the second adjacent eNB as the final target eNB.

16. A serving enhanced Node B (eNB) in a wireless communication system, the serving eNB comprising:
a transmission/reception unit configured to perform wireless communication with a User Equipment (UE);
an eNB interface unit configured to receive, from a plurality of adjacent eNBs, interference power information of an uplink (UL) signal and interference variation information indicating that an interference of the UL signal is increased or decreased;

a memory configured to store the received interference power information of the UL signal and the received interference variation information of the UL signal; and a controller configured to:
select an adjacent eNB, for which the received interference power information indicates that interference power of the UL signal is equal to or greater than a threshold value, as a target eNB for the UE among the at least one adjacent eNB,
determine whether an interference of the target eNB is increased based on the interference variation information received from the target eNB,
if the interference of the target eNB is increased, determine that the handover of the UE is delayed; and
control the transmission/reception unit to transmit a handover parameter to the UE to perform handover to the target eNB.

17. The serving eNB as claimed in claim 16, wherein the controller identifies an adjacent eNB, for which the received interference power information indicates that the interference power of the UL signal is equal to or greater than the threshold value in at least a reference number of times during a preset time interval among the at least one adjacent eNB, as the target eNB.

18. The serving eNB as claimed in claim 16, wherein the controller determines whether an interference increase pattern by the UL signal in the target eNB corresponds to a UL resource allocation pattern associated with the UE, based on the interference variation information received from the target eNB; and
if the interference increase pattern corresponds to the UL resource allocation pattern, the controller determines that the handover of the UE to the target eNB has been delayed.

19. An adjacent enhanced Node B (eNB) in a wireless communication system, the adjacent eNB comprising:
a transmission/reception unit configured to perform wireless communication with a User Equipment (UE);
an eNB interface unit configured to perform communication with a serving eNB; and
a controller configured to:
transmit interference power information of an uplink (UL) signal to the serving eNB,
determine whether interference power of the UL signal is equal to or greater than a threshold value,
if the interference power of the UL signal is equal to or greater than the threshold value, generate interference variation information indicating that an interference of the UL signal is increased or decreased,
transmit the interference variation information to the serving eNB, and
if a request for handover for the UE is received from the serving eNB, perform a handover procedure with the UE,
wherein the interference variation information is used to determine whether the handover of the UE is delayed, and includes increase or decrease information of an interference generated by a UL signal of the UE.

20. The adjacent eNB as claimed in claim 19, wherein the controller selects a level corresponding to the interference power of the UL signal, which is equal to or greater than the threshold value, among a plurality of power levels, and generates the interference variation information based on the selected level.

21. The adjacent eNB as claimed in claim 19, wherein, if the interference variation information includes information according to an interference increase pattern by the UL signal of the UE, a handover delay of the UE is determined, and
wherein the interference increase pattern corresponds to a UL resource allocation pattern associated with the UE.

22. A User Equipment (UE) in a wireless communication system, the UE comprising:
a transmission/reception unit configured to perform wireless communication with a serving enhanced Node B (eNB);
a memory configured to store a first handover parameter set in accordance with a wireless environment of a cell and a second handover parameter set based on a movement speed of the UE; and
a controller configured to:
receive the first handover parameter from the serving eNB,
measure a strength of a reference signal for each of the serving eNB and an adjacent eNB based on the first handover parameter,
if a difference between strengths of reference signals for the serving eNB and the adjacent eNB is equal to or less than a threshold value, receive the second handover parameter from the serving eNB, and
perform handover to the adjacent eNB based on the second handover parameter,
wherein the second handover parameter comprises a handover parameter that is associated with interference power information of an uplink (UL) signal and interference variation information indicating that an interference of the UL signal is increased or decreased, received from the adjacent eNB, and
wherein the interference variation information is used to determine whether the handover of the UE is delayed, and includes increase or decrease information of an interference generated by a UL signal of the UE.

23. The UE as claimed in claim 22, wherein the controller measures the strength of the reference signal for each of the serving eNB and the adjacent eNB based on the second handover parameter, transmits information about the strength of the reference signal for each of the serving eNB and the adjacent eNB measured based on the second handover parameter to the serving eNB, and if a message to perform handover from the serving eNB to the adjacent eNB is received, performs handover to the adjacent eNB.

24. The UE as claimed in claim 22, wherein, if the interference variation information includes information according to an interference increase pattern by the UL signal of the UE, a handover delay of the UE is determined, and
wherein the interference increase pattern corresponds to a UL resource allocation pattern associated with the UE.

25. A serving enhanced Node B (eNB) in a wireless communication system, the serving eNB comprising:
a transmission/reception unit configured to perform wireless communication with a User Equipment (UE);
an eNB interface unit configured to receive, from a plurality of adjacent eNBs, interference power information of an uplink (UL) signal and interference variation information indicating that an interference of the UL signal is increased or decreased;
a memory configured to store the received interference power information of the UL signal and the received interference variation information of the UL signal; and
a controller configured to:
identify adjacent eNBs, for which the received interference power information indicates that interference power of the UL signal is equal to or greater than a threshold value among the plurality of adjacent eNBs, determine whether handover of the UE is delayed and a previously selected target eNB was incorrectly selected based on the interference variation information received from the identified adjacent eNBs, re-select a target eNB of the UE as a final target eNB based on the interference variation information received from the identified adjacent eNBs, and transmit a handover parameter to the UE to perform handover to the re-selected target eNB.

26. The serving eNB as claimed in claim 25, wherein the controller:

determines whether a UL signal corresponding to interference variation information received from a first adjacent eNB among the identified eNBs corresponds to UL resource allocation information associated with the UE, if the UL signal corresponding to the interference variation information received from the first adjacent eNB corresponds to the UL resource allocation information associated with the UE, determines whether handover of the UE to the first adjacent eNB has been delayed, and if the interference variation information received from the first adjacent eNB includes at least a first predetermined number of increase information indicating that the interference power of the UL signal is equal to or greater than the threshold value followed by at least a second predetermined number of decrease information indicating that the interference power of the UL signal is less than the threshold value, determines that the first adjacent eNB was incorrectly selected as the previously selected target eNB.

27. The serving eNB as claimed in claim 25, wherein the controller selects a second adjacent eNB, for which the received interference variation information indicates that the interference power of the UL signal is equal to or greater than the threshold value at a time corresponding to the decrease information of the first adjacent eNB, as the final target eNB.

28. A serving enhanced Node B (eNB) in a wireless communication system, the serving eNB comprising:

a transmission/reception unit configured to perform wireless communication with a User Equipment (UE);

an eNB interface unit configured to receive, from a plurality of adjacent eNBs, interference power information of an uplink (UL) signal and interference variation information indicating that an interference of the UL signal is increased or decreased;

a memory configured to store the received interference power information of the UL signal and the received interference variation information of the UL signal; and a controller configured to:

select a first adjacent eNB, for which the received interference power information indicates that interference power of the UL signal is equal to or greater than a threshold value among the plurality of adjacent eNBs, as a target eNB, determine whether handover of the UE is delayed and decide whether the UE is to handover to the first adjacent eNB based on the interference variation information received from the first adjacent eNB, determine whether the target eNB is incorrectly selected and re-select the target eNB of the UE based on the interference variation information received from the first adjacent eNB after a determination time of the handover, and transmit a handover parameter to the UE to perform handover the re-selected target eNB.

29. The serving eNB as claimed in claim 28, wherein the controller determines whether the UL signal corresponding to the interference variation information received from the first adjacent eNB corresponds to UL resource allocation information associated with the UE, and if the UL signal corresponding to interference variation information received from the first adjacent eNB corresponds to the UL resource allocation information associated with the UE, the controller determines that the handover of the UE to the target eNB of the first adjacent eNB has been delayed.

30. The serving eNB as claimed in claim 28, wherein if the interference variation information received from the first adjacent eNB includes at least a predetermined number of decrease information indicating that the interference power of the UL signal is less than a threshold value after the determination time of the handover, the controller determines that the first adjacent eNB is incorrectly selected as the target eNB, and if a second adjacent eNB, for which the received interference variation information includes increase information indicating that the interference power of the UL signal is equal to or greater than a threshold value after the determination time of the handover, is identified among the plurality of adjacent eNBs, the controller selects the second adjacent eNB as the final target eNB.

* * * * *